United States Patent
Sutardja

(10) Patent No.: US 11,146,657 B2
(45) Date of Patent: Oct. 12, 2021

(54) BINDING A PUBLIC CLOUD USER ACCOUNT AND A PERSONAL CLOUD USER ACCOUNT FOR A HYBRID CLOUD ENVIRONMENT

(71) Applicant: Latticework, Inc., San Jose, CA (US)

(72) Inventor: Pantas Sutardja, Los Gatos, CA (US)

(73) Assignee: Latticework, Inc., San Jose, CA (US)

( * ) Notice: Subject to any disclaimer, the term of this patent is extended or adjusted under 35 U.S.C. 154(b) by 412 days.

(21) Appl. No.: 16/272,388

(22) Filed: Feb. 11, 2019

(65) Prior Publication Data

US 2020/0076917 A1   Mar. 5, 2020

Related U.S. Application Data

(60) Provisional application No. 62/725,955, filed on Aug. 31, 2018.

(51) Int. Cl.
   *H04L 29/06*    (2006.01)
   *H04L 29/08*    (2006.01)
   *H04L 9/08*     (2006.01)

(52) U.S. Cl.
   CPC .......... *H04L 67/306* (2013.01); *H04L 9/0866* (2013.01); *H04L 63/0407* (2013.01); *H04L 63/104* (2013.01)

(58) Field of Classification Search
   None
   See application file for complete search history.

(56) References Cited

U.S. PATENT DOCUMENTS

| | | | |
|---|---|---|---|
| 2013/0046982 A1* | 2/2013 | Suh | H04L 9/083 713/171 |
| 2015/0106130 A1* | 4/2015 | Woods | G06Q 40/08 705/4 |
| 2017/0237812 A1* | 8/2017 | Sutardja | G06F 9/5061 709/217 |

FOREIGN PATENT DOCUMENTS

| | | |
|---|---|---|
| CN | 105978981 A | 9/2016 |
| CN | 107104958 A | 8/2017 |

* cited by examiner

*Primary Examiner* — Andrew J Steinle

(74) *Attorney, Agent, or Firm* — Invoke

(57) ABSTRACT

Binding a public cloud account and a personal cloud account is described. A pre-approval list indicates that a user's public cloud account and personal cloud account are approved for binding. A copy of the pre-approval list is stored on the personal cloud device; another copy is stored on the public cloud service. The user logs into the public cloud account using a client device. Based on the pre-approval list stored on the public cloud service, the client device obtains information identifying the user's personal cloud account. The personal cloud device verifies the pre-approval of the binding based on the pre-approval list stored on the personal cloud device. The personal cloud device transmits a verification to the public cloud service. Each of the public cloud service and the personal cloud device stores information indicating the binding.

17 Claims, 11 Drawing Sheets

FIG. 3

(MANUAL BINDING)

(PRE-APPROVAL BINDING)

(EXPORTATION)

(SHARING)

BINDING A PUBLIC CLOUD USER ACCOUNT AND A PERSONAL CLOUD USER ACCOUNT FOR A HYBRID CLOUD ENVIRONMENT

INCORPORATION BY REFERENCE

Each of the following applications are hereby incorporated by reference: U.S. Provisional Patent Application No. 62/725,955, filed Aug. 31, 2018.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to hybrid cloud environments. In particular, the present disclosure relates to binding a public cloud user account and a personal cloud user account for a hybrid cloud environment.

BACKGROUND

A computer network provides connectivity among a set of nodes. A node may execute a client process and/or a server process. A client process makes a request for a computing service (such as, execution of a particular application, and/or storage of a particular amount of data) through the computer network. A server process responds by executing the requested service and/or returning corresponding data through the computer network.

In a cloud environment, network resources that execute server processes are shared amongst multiple clients. Clients may request computing services from the computer network independently of each other. Network resources may be dynamically assigned to the requests and/or clients on an on-demand basis.

In a personal cloud, one or more personal cloud devices are used to execute server processes. The personal cloud devices are provisioned for exclusive use by a particular group of one or more entities (such as, corporations, organizations, persons). Generally, an entity that is using the personal cloud is responsible for managing the personal cloud, including maintaining a network connection, maintaining user accounts, and maintaining security. A personal cloud device may be protected behind a firewall that is maintained by an entity using the personal cloud. A personal cloud device may be located on the premises of an entity using the personal cloud.

In a public cloud, a set of public cloud devices implement a cloud service for multiple entities that are independent of each other (also referred to as "tenants" or "customers" of the cloud service). Clients of different tenants may access the same network resource to request a cloud service. Generally, a cloud service provider manages a public cloud. A tenant need not be responsible for managing a public cloud. A tenant uses an application programming interface (API) provided by the cloud service provider to make requests for a cloud service. Through the API, the tenant may request execution of a particular application on the public cloud. Additionally or alternatively, the tenant may request storage and/or retrieval of a particular data set on the public cloud. Tenant isolation techniques may be used to ensure the security of tenant data processed by a same public cloud device.

A hybrid cloud includes both a personal cloud and public cloud. An interface between the personal cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

A user desiring to use a hybrid cloud needs to be authenticated to both the personal cloud and the public cloud. Such an authentication process may be overly cumbersome for a user. Moreover, while a user may typically connect to a public cloud service via the Internet, the user may need to execute a complex process to establish a connection with a personal cloud device. As an example, a user may need to ensure that firewall settings associated with the personal cloud device allow the user to communicate with the personal cloud device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
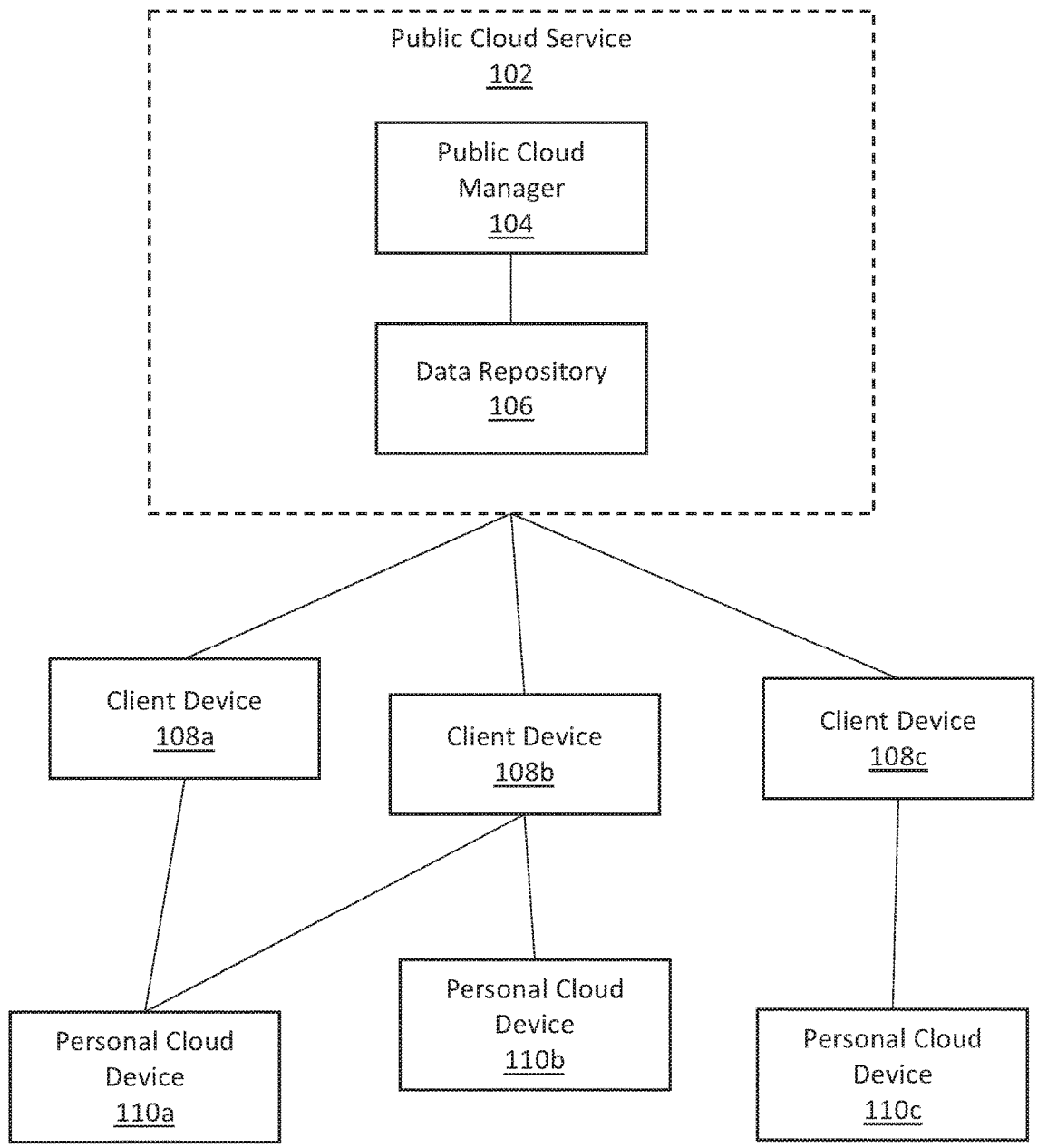
FIGS. 1A-1C illustrates an example hybrid cloud system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. HYBRID CLOUD SYSTEM ARCHITECTURE
3. MANUALLY BINDING A PUBLIC CLOUD USER ACCOUNT AND A PERSONAL CLOUD USER ACCOUNT
4. BINDING A PUBLIC CLOUD USER ACCOUNT AND A PERSONAL CLOUD USER ACCOUNT BASED ON A PRE-APPROVAL
5. EXPORTING A CONTENT ITEM BASED ON A BINDING BETWEEN A PUBLIC CLOUD USER ACCOUNT AND A PERSONAL CLOUD USER ACCOUNT
6. SHARING A CONTENT ITEM BASED ON A BINDING BETWEEN A PUBLIC CLOUD USER ACCOUNT AND A PERSONAL CLOUD USER ACCOUNT
7. EXAMPLE EMBODIMENTS
8. COMPUTER NETWORKS AND CLOUD NETWORKS
9. HARDWARE OVERVIEW
10. MISCELLANEOUS; EXTENSIONS

1. General Overview

One or more embodiments involve a hybrid cloud environment. A hybrid cloud environment includes a public cloud service, a personal cloud device, and a client device that accesses both the public cloud service and the personal cloud device. A personal cloud account for using the personal cloud device and a public cloud account for using the public cloud service may be bound together to facilitate communications with both the personal cloud device and the public cloud service, thereby creating a more integrated hybrid cloud environment.

One or more embodiments include binding a public cloud user account and a personal cloud user account for a hybrid cloud environment. An administrator of the personal cloud device creates a pre-approval list, indicating which public cloud user accounts are pre-approved to be bound with which personal cloud user accounts. A copy of the pre-approval list is stored on the personal cloud device, and another copy of the pre-approval list is stored on the public cloud service.

A user logs into the user's public cloud account through a client device. The public cloud service accesses a pre-approval list stored in a data repository associated with the public cloud service. Based on the pre-approval list, the public cloud service determines that the user's public cloud user account is pre-approved to be bound with a particular personal cloud user account on a particular personal user device. The particular personal cloud user account is associated with the same user. The public cloud service generates a credential. The public cloud service transmits, to the client device, (a) information indicating that the user's public cloud user account is pre-approved to be bound with the user's personal cloud user account and (b) the credential.

Optionally, the client device presents, using a user interface, a request for a new key corresponding to the user's personal cloud user account. The client device receives, using the user interface, the key as user input. The client device establishes a connection with the particular personal cloud device (which may be performed with the assistance of the public cloud service). The client device transmits, to the particular personal cloud device, a request to bind the user's public cloud user account and the user's personal cloud user account. The request includes (a) the key entered through the user interface and (b) the credential received from the public cloud service.

The personal cloud device stores the key in association with the personal cloud account, such that the user may subsequently use the key to log into the personal cloud account.

Further, the personal cloud device accesses a pre-approval list stored in a data repository associated with the personal cloud device. Based on the pre-approval list, the personal cloud device verifies that the user's public cloud user account is pre-approved to be bound to the user's personal cloud user account. The personal cloud device transmits, to the public cloud service, (a) a verification indicating that the user's public cloud user account and the user's personal cloud user account are approved to be bound and (b) the credential received from the client device.

The public cloud service verifies that the credential received from the personal cloud device is the same as the credential earlier generated by the public cloud service. Upon verification, the public cloud service stores a binding between the user's public cloud user account and the user's personal cloud user account. The binding is stored at a data repository associated with the public cloud service. The public cloud service transmits a confirmation of the binding to the personal cloud device.

Upon receiving the confirmation, the personal cloud device stores a binding between the user's public cloud user account and the user's personal cloud user account. The binding is stored at a data repository associated with the personal cloud device. Hence, the public cloud account and the personal cloud account are bound together.

One or more embodiments include exporting a content item associated with a personal cloud user account to a public cloud user account based on a binding between the two accounts. Exportation includes making a user's personal cloud content item accessible to the user's public cloud user account. A personal cloud device receives a request to export a content item that is associated with a user's personal cloud user account. The personal cloud device accesses a binding list. Based on the binding list, the personal cloud device verifies that a binding exists between the user's personal cloud user account and a particular public cloud user account. The particular public cloud user account is associated with the same user. The personal cloud device transmits, to the public cloud service, information indicating that the content item is approved for exporting to the user's public cloud user account. Once the content item is exported, the user may view and/or access the content item from the user's public cloud user account.

One or more embodiments include sharing a content item associated with a personal cloud user account using a public cloud user account based on a binding between the two accounts. Sharing includes making a user's personal cloud content item accessible to a public cloud user account of another user. A personal cloud device receives a request to share a content item that is associated with a personal cloud user account of an originating user. The request indicates that the content item should be shared with a public cloud user account of a recipient user. The personal cloud device accesses a binding list. Based on the binding list, the personal cloud device determines that a binding exists between the originating user's personal cloud user account and a particular public cloud user account. The particular public cloud user account is associated with the same originating user. The personal cloud device transmits, to the public cloud service, a request to use the originating user's public cloud user account to share the content item with the recipient user's public cloud user account. The public cloud device confirms that the content item has been exported to the originating user's public cloud account. The public cloud device makes the content item accessible to the recipient user's public cloud account. The recipient user may then receive a notification that the content item has been shared from the originating user's public cloud user account. The recipient user may view and/or access the content item from the recipient user's public cloud user account.

One or more embodiments described in this Specification and/or recited in the claims may not be included in this General Overview section.

2. Hybrid Cloud System Architecture

FIG. 1A illustrates a hybrid cloud system, in accordance with one or more embodiments. As illustrated in FIG. 1, a system 100 includes a public cloud service 102, one or more client devices 108a-c, and one or more personal cloud devices 110a-c. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a public cloud service 102 is a cloud environment used by one or more entities (also referred to herein as "tenants"). A tenant may be, for example, a corporation, organization, enterprise, person, or other entity. Tenants are independent of each other. Businesses or operations of tenants are separate from each other.

Tenants of a public cloud service 102 may be but are not necessarily involved in managing the hardware, software, and other supporting infrastructure of the public cloud service 102. Rather, a public cloud service provider manages the hardware, software, and other supporting infrastructure of the public cloud service 102. The public cloud service provider may implement tenant isolation techniques. Tenant isolation may involve: ensuring that a tenant can access only the tenant's own data (and not the data of other tenants), ensuring that data of different tenants do not interact with each other, and/or minimizing the effect of one tenant's resource requests on another tenant's quality of service. (Where the public cloud service 102 is used in conjunction with one or more person cloud devices to provide a hybrid cloud environment, the public cloud service provider may be referred to as a "hybrid cloud service provider.")

A public cloud service 102 includes a public cloud manager 104 and a data repository 106. Further details regarding a public cloud service 102 are described below with reference to FIG. 1B.

In one or more embodiments, a personal cloud device (such as any of personal cloud devices 110a-c) provides a personal cloud to a single entity (or a single group of related entities). The entity itself manages the hardware, software, and other supporting infrastructure of the personal cloud device. Further details regarding a personal cloud device are described below with reference to FIG. 1C.

In one or more embodiments, a public cloud service 102 and one or more personal cloud devices (such as any of personal cloud devices 110a-c) together provide a hybrid cloud environment. An entity is both (a) a tenant of the public cloud service 102 and (b) an owner, manager, and/or user of a personal cloud device. Data associated with the entity may be stored at the public cloud service 102 and/or the personal cloud device.

Additional embodiments and/or examples relating to computer networks are described below in Section 8, titled "Computer Networks and Cloud Networks."

In one or more embodiments, a client device (such as any of client devices 108a-c) requests services from a public cloud service 102 and/or a personal cloud device (such as any of personal cloud devices 110a-c).

A client device that is associated with a tenant of a public cloud service 102 may access the public cloud service 102. The client device may include hardware and/or software managed by the tenant. Additionally or alternatively, the client device may be used by a person associated with the tenant (such as an employee of the tenant, or a registered user of a product or service of the tenant).

A client device that is associated with an entity managing a personal cloud device may access the personal cloud device. The client device may include hardware and/or software managed by the entity. Additionally or alternatively, the client device may be used by a person associated with the entity (such as an employee of the entity, or a family member of the entity).

As an example, client device 108a may execute an application associated with a tenant of public cloud service 102. Client device 108b may execute an application associated with another tenant of public cloud service 102. Client device 108c may execute an application associated with another tenant of public cloud service 102. Hence, as illustrated, each of client devices 108a-c may access public cloud service 102.

Continuing the example, Daddy Joe may manage personal cloud device 110a. Daddy Joe may grant Little Johnny (who is Daddy Joe's son) access to personal cloud device 110a. Meanwhile Little Johnny may manage personal cloud device 110b. Justin may manage personal cloud device 110c.

Since Daddy Joe is the administrator of personal cloud device 110a, client device 108a of Daddy Joe may access personal cloud device 110a. Further, since Daddy Joe has granted access to Little Johnny, client device 108b of Little Johnny may access personal cloud device 110a. Client device 108c of Justin cannot access personal cloud device 110a.

Since Little Johnny is the administrator of personal cloud device 110b, client device 108b of Little Johnny may access personal cloud device 110b. Client devices 108a and 108c cannot access personal cloud device 110b.

Since Justin is the administrator of personal cloud device 110c, client device 108c of Justin may access personal cloud device 110c. Client devices 108a-b cannot access personal cloud device 110c.

Hence, as illustrated, client devices 108a-b may access personal cloud device 110a. Client device 108b may access personal cloud device 110b. Client device 108c may access personal cloud device 110c.

In one or more embodiments, a client device executes an interface for interacting with both the public cloud service 102 and/or the personal cloud device. The client device may request storage of a content item at the public cloud service 102 and/or the personal cloud device. The client device may request retrieval of a content item from the public cloud service 102 and/or the personal cloud device. A content item stored on a data repository associated with a public cloud service 102 may be referred to herein as a "public cloud content item." A content item stored on a data repository associated with a personal cloud device may be referred to herein as a "personal cloud content item."

Figure 1B:
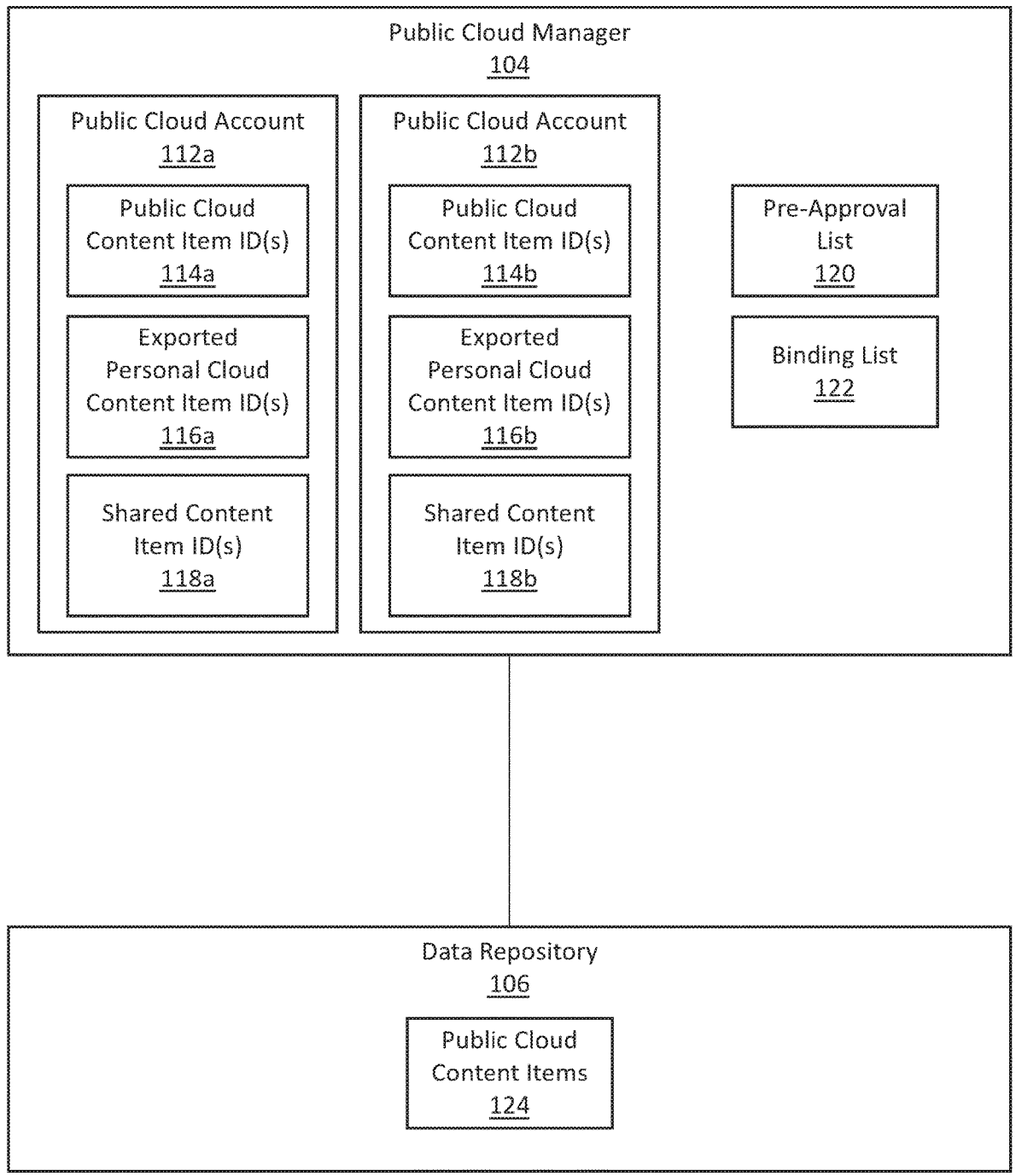

FIG. 1B illustrates a public cloud manager and a data repository of a public cloud service, in accordance with one or more embodiments. Labels of the same number across FIGS. 1A-1C refer to similar components.

In one or more embodiments, a data repository 106 is any type of storage unit and/or device (e.g., a file system, database, collection of tables, or any other storage mechanism) for storing data. Further, a data repository 106 may include multiple different storage units and/or devices. The multiple different storage units and/or devices may or may not be of the same type or located at the same physical site. Further, a data repository 106 may be implemented or executed on the same computing system as a public cloud manager 104. Alternatively or additionally, a data repository 106 may be implemented or executed on a computing system separate from a public cloud manager 104. The data repository 106 may be communicatively coupled to the public cloud manager 104 via a direct connection or via a network.

In one or more embodiments, a data repository 106, associated with a public cloud service 102, stores one or more public cloud content items 124. A public cloud content item 124 is a content item associated with a tenant of the public cloud service 102.

In one or more embodiments, a public cloud manager 104 refers to hardware and/or software configured to manage a public cloud service 102. The public cloud manager 104 manages one or more public cloud user accounts 112a-b, a pre-approval list 120, and a binding list 122.

In one or more embodiments, a public cloud user account (such as any of public cloud user accounts 112a-b) is a user account that a user logs into in order to request services of a public cloud service 102. Each public cloud user account (also referred to herein as a "public cloud account") is associated with a unique identifier (such as a username). A user may enter a username and a key to login to the user's public cloud user account.

Each public cloud user account may be associated with one or more public cloud content item identifiers (IDs), one or more exported personal cloud content item IDs, and one or more shared content item IDs. As illustrated, public cloud account 112a is associated with public cloud content item IDs 114a, exported personal cloud content item IDs 116a, and shared content item IDs 118a. Public cloud account 112b is associated with public cloud content item IDs 114b, exported personal cloud content item IDs 116b, and shared content item IDs 118b.

Content item IDs associated with a particular public cloud user account identify content items that are accessible to the particular public cloud user account. As an example, a user logged into public cloud account 112a may access any content item(s) identified by public cloud content item IDs 114a, exported personal cloud content item IDs 116a, and/or shared content item IDs 118a.

A public cloud content item ID, associated with a particular public cloud user account, identifies a public cloud content item 124 that (a) is stored on a data repository 106 associated with a public cloud service 102 and (b) is owned and/or managed by the particular public cloud user account. As an example, Mary may upload a photo to a public cloud service. The photo, stored on the public cloud service, may be associated with a public cloud content item ID, ID #PUB123. Mary's public cloud user account may be updated to indicate an association with ID #PUB123.

An exported cloud content item ID, associated with a particular public cloud user account, identifies a personal cloud content item that (a) is stored on a data repository associated with a personal cloud device (such as any of personal cloud devices 110a-c) and (b) has been exported to the particular public cloud user account. As an example, Mary may store a photo on a personal cloud device. The photo, stored on the personal cloud device, may be associated with a personal cloud content item ID, ID #PER456. Mary may export the photo to Mary's own public cloud user account. Mary's public cloud user account is stored in association with ID #PER456. Further details regarding exportation are described below with reference to FIG. 4.

A shared content item ID, associated with a particular public cloud user account, identifies a content item that has been shared from another public cloud user account. As an example, shared content item ID 118a, associated with public cloud account 112a, may be associated with a content item that has been shared from public cloud account 112b. The shared content item may be a public cloud content item 124 stored on a data repository 106 associated with a public cloud service 102. Alternatively, the shared content item may be a personal cloud content item stored on a data repository associated with a personal cloud device (such as any of personal cloud devices 110a-c). Further details regarding sharing are described below with reference to FIG. 5.

In one or more embodiments, a pre-approval list 120 identifies which public cloud user accounts 112a-b and which personal cloud user accounts 126a-b are approved for binding with each other. A pre-approval list 120 may identify a personal cloud user account by using (a) an identifier of the personal cloud user account and (b) an identifier of the personal cloud device associated with the personal cloud user account. A pre-approval list 120 may be stored in any data structure, which may be but is not necessarily a list.

As an example, John's personal cloud device may be associated with a unique identifier, ID #321. John's personal cloud device may be associated with two personal cloud user accounts. One account may have the username "JohnMe" for John himself. Another account may have the username "Daddy" for John's father.

Continuing the example, Mary's personal cloud device may be associated with a unique identifier, ID #654. Mary's personal cloud device may be associated with two personal cloud user accounts. One account may have the username "IAmMary" for Mary himself. Another account may have the username "Daddy" for Mary's father.

Continuing the example, John, John's father, Mary, and Mary's father may each utilize a public cloud service. John's public cloud user account may have the username "John.Smith." John's father's public cloud user account may have the username "David. Smith." Mary's public cloud user account may have the username "Mary123." Mary's father's public cloud user account may have the username "Frank.Ho."

Continuing the example, a pre-approval list, associated with a public cloud service, may indicate the following:

| Public Cloud Account | Personal Cloud Account | Personal Cloud Device |
|---|---|---|
| John.Smith | JohnMe | ID #321 |
| David.Smith | Daddy | ID #321 |
| Mary123 | IAmMary | ID #654 |
| Frank.Ho | Daddy | ID #654 |

In the above example, the pre-approval list indicates that the public cloud account "David.Smith" and the personal cloud account "Daddy" on personal cloud device ID #321 are approved to be bound together. The pre-approval list further indicates that the public cloud account "Frank.Ho" and the personal cloud account "Daddy" on personal cloud device ID #654 are approved to be bound together.

In one or more embodiments, a binding list 122 identifies which public cloud user accounts 112a-b and which personal cloud user accounts 126a-b are bound together. A binding list 122 may identify a personal cloud user account by using (a) an identifier of the personal cloud user account and (b) an identifier of the personal cloud device associated with the personal cloud user account. A binding list 122 may be stored in any data structure, which may be but is not necessarily a list.

In one or more embodiments, a pre-approval list 120 is generated and/or updated based on an approval for binding provided by an administrator of a personal cloud device. In contrast, a binding list 122 is generated and/or updated based on a request for binding submitted from a user who would like to bind the user's personal cloud account and the user's public cloud account. The binding between the two accounts is generated and stored in the binding list 122, if the binding has been approved as indicated in the pre-approval list 120.

In one or more embodiments, a public cloud manager 104 is configured to perform operations described herein for binding a public cloud user account and a personal cloud user account, exporting a content item, and/or sharing a content item. Examples of operations for binding a public cloud user account and a personal cloud user account, exporting a content item, and/or sharing a content item are described below with reference to FIGS. 2-5.

Figure 1C:
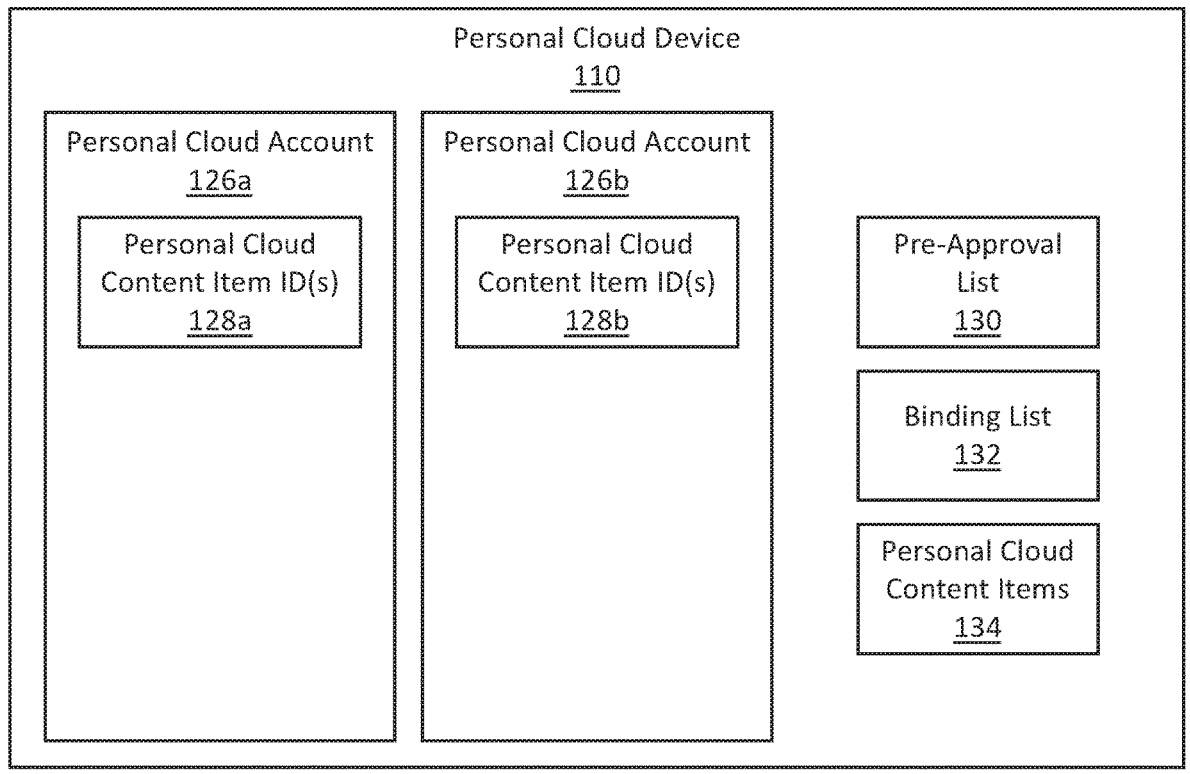

FIG. 1C illustrates a personal cloud device, in accordance with one or more embodiments. Labels of the same number across FIGS. 1A-1C refer to similar components.

In one or more embodiments, a personal cloud device 110 is associated with a data repository that stores one or more personal cloud content items 134. A personal cloud device 110 and an associated data repository may be implemented or executed on the same computing system. Alternatively or additionally, a personal cloud device 110 and an associated data repository may be implemented or executed on separate computing systems.

In one or more embodiments, a personal cloud device 110 manages one or more personal cloud user accounts 126a-b, a pre-approval list 130, and a binding list 132.

In one or more embodiments, a personal cloud user account (such as any of personal cloud user accounts 126a-b) is a user account that a user logs into in order to request services of a personal cloud device 110. Each personal cloud user account (also referred to herein as a "personal cloud account") of a personal cloud device 110 is associated with an identifier (such as a username) that is unique for the personal cloud device 110. However, personal cloud user accounts of different personal cloud device may have the same identifiers. A user may enter a username and a key to login to the user's personal cloud user account.

In one or more embodiments, personal cloud user accounts 126a-b of a personal cloud device 110 are maintained by one or more administrators (users of the personal device 110 with special privileges). In an embodiment, an administrator sets up each personal cloud user account, including for example providing a username and/or key for each personal cloud user account. In another embodiment, a user may request a personal cloud user account. The administrator may determine whether to approve the request. Upon approval, the user may be permitted to set up a username and/or key for the user's personal cloud user account. Information associated with personal cloud user accounts 126a-b of a personal cloud device 110 (such as, usernames, identifiers, keys, profiles) is stored on a data repository associated with the personal cloud device 110.

Each personal cloud user account is associated with one or more personal cloud content item IDs. As illustrated, personal cloud account 126a is associated with personal cloud content item IDs 128a. Personal cloud account 126b is associated with personal cloud content item IDs 128b.

A personal cloud content item ID, associated with a particular personal cloud user account, identifies a personal cloud content item 134 that (a) is stored on a data repository associated with a personal cloud device 110 and (b) is owned by, managed by, and/or otherwise accessible to the particular personal cloud user account. As an example, Mary may store a photo on a personal cloud device. The photo, stored on the personal cloud device, may be associated with a personal cloud content item ID, ID #PER456. Mary's personal cloud user account may be updated to indicate an association with ID #PER456.

In one or more embodiments, a pre-approval list 130 is similar to the pre-approval list 120 described above with reference to FIG. 1B. The pre-approval list 130 is stored on a data repository associated with a personal cloud device 110, whereas the pre-approval list 120 is stored on a data repository associated with a public cloud service 102. The personal cloud device 110 may access the pre-approval list 130 (rather than the pre-approval list 120) to perform verifications. The public cloud service 102 may access the pre-approval list 120 (rather than the pre-approval list 130) to perform verifications. A binding is generated only if approval for the binding is verified by both sides (the personal cloud device 110 and the public cloud service 102).

In one or more embodiments, a binding list 132 is similar to the binding list 122 described above with reference to FIG. 1B. The binding list 132 is stored on a data repository associated with a personal cloud device 110, whereas the binding list 122 is stored on a data repository associated with a public cloud service 102. The personal cloud device 110 may access the binding list 132 (rather than the binding list 122) to perform verifications. The public cloud service 102 may access the binding list 122 (rather than the binding list 132) to perform verifications. Certain actions (such as exportation, or sharing) associated with a public cloud account and a personal cloud account are taken only if binding of the two accounts is verified by both sides (the personal cloud device 110 and the public cloud service 102).

In an embodiment, a public cloud manager 104, a personal cloud device 110, and/or a client device is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

Figure 2:
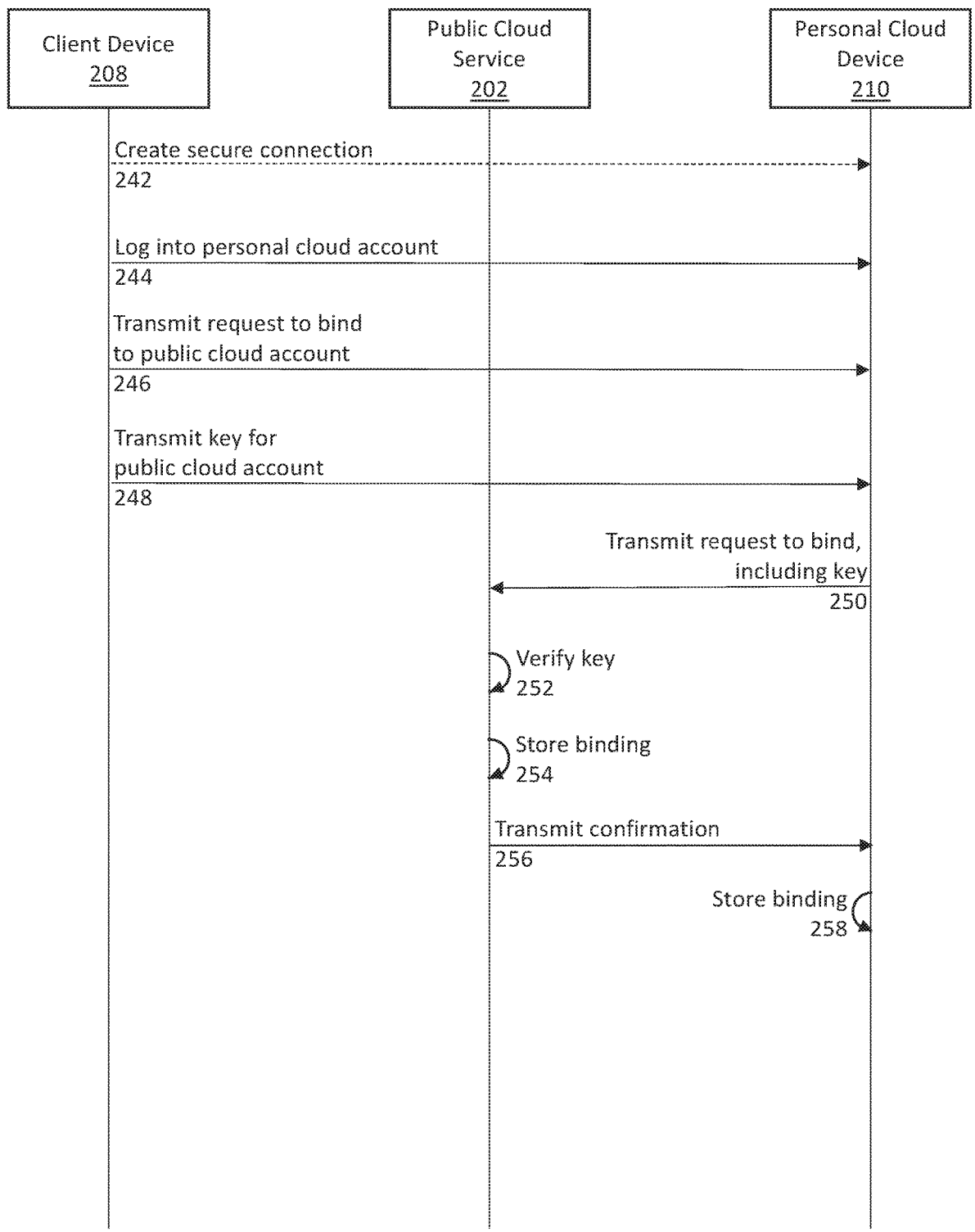
FIG. 2 illustrates an example set of operations for manually binding a public cloud user account and a personal cloud user account, in accordance with one or more embodiments.

3. Manually Binding a Public Cloud User Account and a Personal Cloud User Account FIG. 2 illustrates an example set of operations for manually binding a public cloud user account and a personal cloud user account, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Client device 208 is similar to any of client devices 108a-c of FIG. 1. Public cloud service 202 is similar public cloud service 102 of FIG. 1. Personal cloud device 210 is similar to any of personal cloud devices 110a-c of FIG. 1.

In one or more embodiments, a client device 208 creates a secure connection with a personal cloud device 210 (Operation 242). Depending on the personal cloud device 210, creating a secure connection may involve a process that is complex and/or tedious for a user of the client device 208 and/or an administrator of the personal cloud device 210. As an example, an administrator of a personal cloud device 210 may need to modify firewall settings to allow a user's client device 208 to access the personal cloud device 210. Further, the user may need to provide certain configurations for the client device 208 in order to overcome the firewall associated with the personal cloud device 210. As another example, an administrator of a personal cloud device 210 may need to specify a particular port for a user's client device 208 to access the personal cloud device 210. Further, the user may need to configure the client device 208 to communicate with the particular port of the personal cloud device 210.

In one or more embodiments, a client device 208 logs into a personal cloud account associated with the personal cloud device 210 (Operation 244). The client device 208 presents a prompt on a user interface, requesting a username (or other identifier) of a personal cloud account. The client device 208 may also request a key for logging into the personal cloud account. The client device 208 receives the username and key through the user interface. The client device 208 transmits the information to the personal cloud device 210. The personal cloud device 210 verifies the received information against the personal cloud user account information stored on a data repository associated with the personal cloud device 210. If the personal cloud device 210 determines that the key provided for the personal cloud account is correct, the personal cloud device 210 allows the user to log into the personal cloud account. The client device 208 may receive a confirmation that the personal cloud account has been logged in.

In one or more embodiments, the client device 208 transmits a request to bind to a particular public cloud account (Operation 246). The client device receives user input indicating a username (or other identifier) of a public cloud account, associated with a public cloud service 202, to be bound to the personal cloud account. In response to the user input, the client device 208 transmits a request to bind the personal cloud account to the public cloud account. The request is transmitted to the personal cloud device 210.

In one or more embodiments, the client device 208 transmits a key for the public cloud account (Operation 248). The client device 208 also receives user input indicating a key for logging into the public cloud account. The client device 208 transmits the key for the public cloud account to the personal cloud device 210.

In one or more embodiments, the personal cloud device 210 transmits a request to bind the personal cloud account and the public cloud account (Operation 250). The request includes the key for the public cloud account.

In one or more embodiments, the public cloud service 202 verifies the key for the public cloud account (Operation 252). Responsive to verifying that the key is correct, the public cloud service 202 stores a binding between the personal cloud account and the public cloud account (Operation 254). Information indicating the binding between the personal cloud account and the public cloud account is stored on a data repository associated with the public cloud service 202. The information indicating the binding may be stored in a binding list, such as binding list 122 of FIG. 1B. The information stored may include (a) the username of the personal cloud account, (b) an identifier of the personal cloud device 210, and (c) the username of the public cloud account.

In one or more embodiments, the public cloud service 202 transmits a confirmation of the binding to the personal cloud device 210 (Operation 210). Responsive to receiving the confirmation, the personal cloud device 210 stores a binding between the personal cloud account and the public cloud account (Operation 258). The binding is stored on a data repository associated with the personal cloud device 210. Information indicating the binding between the personal cloud account and the public cloud account may be stored in a binding list, such as binding list 132 of FIG. 1C. The information stored may include (a) the username of the personal cloud account, and (b) the username of the public cloud account. Once information indicating the binding is stored on both the personal cloud device 210 and the public cloud service 202, the binding between the public cloud account and the personal cloud account is generated.

Based on the operations of FIG. 2, a binding between a public cloud account and a personal cloud account is generated without the use of a pre-approval list. A user of a client device 208 needs to (a) configure the client device 208 to connect with the personal cloud device 210, (b) input the personal cloud account username and key, and (c) input the public cloud account username and key.

Figure 3:
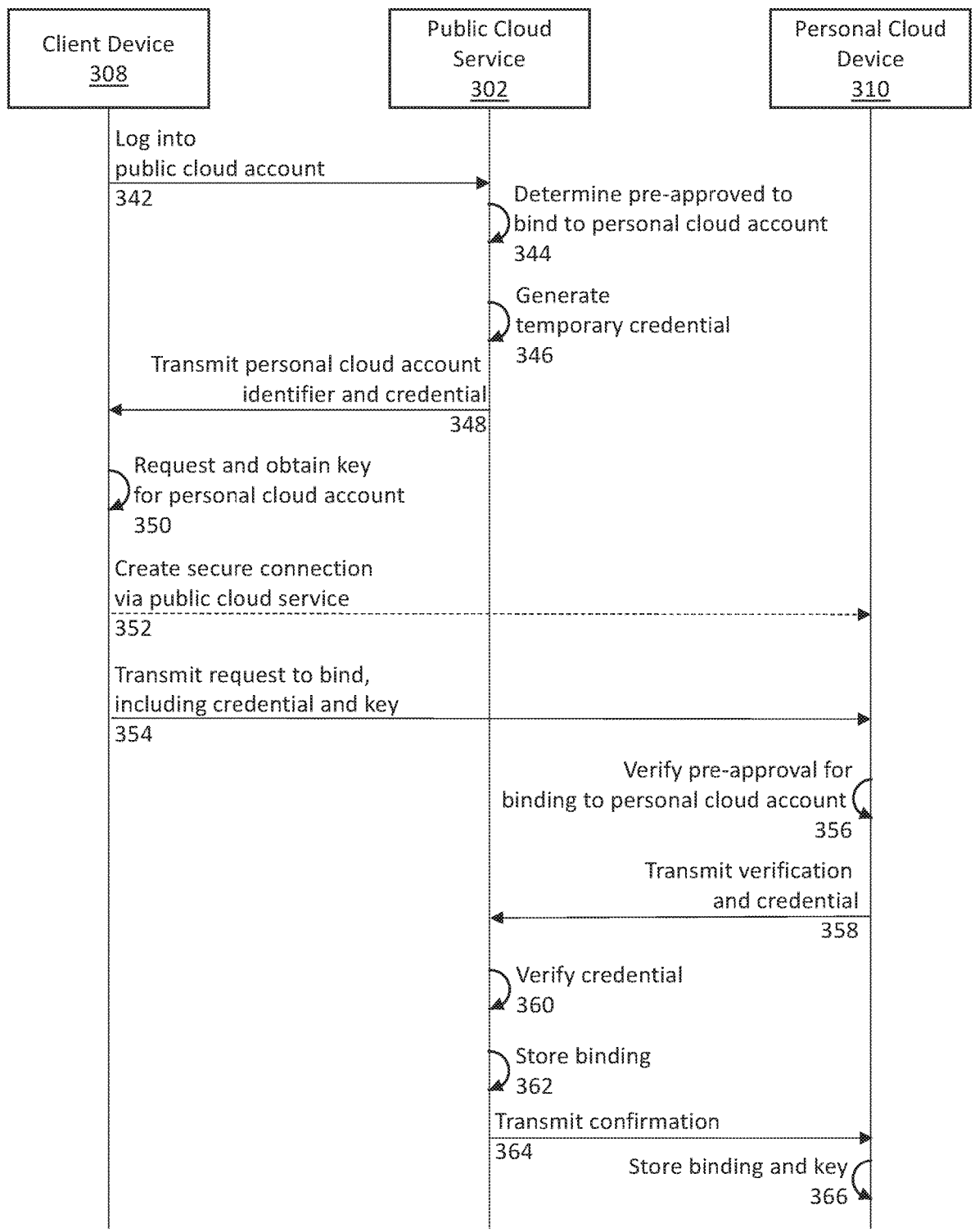
FIG. 3 illustrates an example set of operations for binding a public cloud user account and a personal cloud user account based on a pre-approval, in accordance with one or more embodiments.

4. Binding a Public Cloud User Account and a Personal Cloud User Account Based on a Pre-Approval FIG. 3 illustrates an example set of operations for binding a public cloud user account and a personal cloud user account based on a pre-approval, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

Client device 308 is similar to any of client devices 108a-c of FIG. 1. Public cloud service 302 is similar public cloud service 102 of FIG. 1. Personal cloud device 310 is similar to any of personal cloud devices 110a-c of FIG. 1.

Prior to the performance of the operations of FIG. 3, a pre-approval list is generated. An administrator of a personal cloud device 310 may enter a pre-approval list using an interface associated with the personal cloud device 310. The administrator logs into the personal cloud device 310. The administrator enters information allowing a personal cloud account to be created for a particular user. Additionally, the administrator enters information allowing a binding to be generated between the personal cloud account and a particular public cloud account. The administrator may identify the public cloud account by the username (or other identifier) associated with the public cloud account. The personal cloud device 310 stores a copy of the pre-approval list on a data repository associated with the personal cloud device 310. Additionally, the personal cloud device 310 transmits the pre-approval list to a public cloud service 302. The public cloud service 302 stores a separate copy of the pre-approval list on a data repository associated with the public cloud service 302. Optionally, the public cloud service 302 may merge information indicated in pre-approval lists of multiple different personal cloud devices into one pre-approval list that is maintained by the public cloud service 302. Optionally, the personal cloud device 310 may transmit a notification (such as an email) to the particular user to inform him that his personal cloud account and public cloud account have been pre-approved for binding.

In one or more embodiments, a client device 308 logs into a public cloud account of a public cloud service 302 (Operation 342). The client device 308 presents a prompt on a user interface, requesting a username (or other identifier) of a public cloud account. The client device 308 may also request a key for logging into the public cloud account. The user interface may be, for example, a web interface for accessing the public cloud service 302. The client device 308 receives the username and key through the user interface. The client device 308 transmits the information to the public cloud service 302. The public cloud service 302 verifies the information and allows the user to log into the public cloud account. The client device 308 may receive a confirmation that the public cloud account has been logged into.

In one or more embodiments, the public cloud service 302 determines that the public cloud account is pre-approved to bind to a particular personal cloud account (Operation 344). The public cloud service 302 obtains a pre-approval list from a data repository associated with the public cloud service 302. The pre-approval list may be, for example, the pre-approval list 120 of FIG. 1B. The public cloud service 302 performs a lookup on the pre-approval list using the username of the public cloud account. The public cloud service 302 finds an entry in the pre-approval list associated with the username of the public cloud account. The entry in the pre-approval list includes (a) the username of the public cloud account, (b) a username (or other identifier) of a personal cloud account, and (c) an identifier of a personal cloud device 310. Based on the above information, the public cloud service 302 determines that the public cloud account is pre-approved to bind to the personal cloud account associated with the personal cloud device 310.

In one or more embodiments, the public cloud service 302 generates a temporary credential (Operation 346). The public cloud service 302 may generate the temporary credential by any means, for example, by using a random number generator and/or a pseudo-random number generator. The public cloud service 302 stores the temporary credential on a data repository associated with the public cloud service 302.

In one or more embodiments, the public cloud service 302 transmits the personal cloud account identifier and the temporary credential to the client device 308 (Operation 348). The personal cloud account identifier includes (a) the username of the personal cloud account and (b) an identifier of the personal cloud device 310.

In one or more embodiments, the client device 308 presents, on a user interface, a request for a key for logging into the personal cloud account (Operation 350). This is an optional operation performed in the process of binding the personal cloud account and the public cloud account. The client device 308 may present the username of the personal cloud account on the user interface. The client device 308 may present a textbox configured to receive a key for logging into the personal cloud account. The client device 308 receives the key as user input through the user interface.

In an embodiment, the user interface of the client device 308 requests a new key, selected and/or chosen by the user himself, for logging into the personal cloud account. Since the user is already authenticated by means of being logged into the public cloud account, the client device 308 provides the user the ability to create the key to the user's personal cloud account. The user may subsequently use the same key for logging into the user's personal cloud account. Hence, the user may perform two actions, (a) the creation of a password for the personal cloud account and (b) the binding of the personal cloud account to the public cloud account, in a single interaction process with the client device 308.

In an embodiment, the user interface of the client device 308 requests an existing key for logging into the personal cloud account. As an example, the existing key may be previously set by the administrator of the personal cloud device. The existing key may be communicated from the administrator to the user using any means, such as, email, text messaging, or orally by telephone. As another example, the existing key may be previously set by the user himself. The user may set the key to the user's personal cloud account through a direct interface to the personal cloud device. The existing key may be used as an additional piece of information (in addition to the temporary credential) for the personal cloud device 310 to authenticate the user.

In one or more embodiments, the client device 308 creates a secure connection with the personal cloud device 310 via the public cloud service 302 (Operation 352). The connection between the client device 308 and the personal cloud device 310 may be a "direct connection" or a "tunnel connection."

In an embodiment, the public cloud service 302 facilitates the establishment of a direct connection between the client device 308 and the personal cloud device 310. The client device 308 transmits a request to the public cloud service 302 to establish a direct connection with the personal cloud device 310. The public cloud service 302 transmits information to the client device 308 and the personal cloud device 310 to be used for establishing the connection.

The information transmitted from the public cloud service 302 may include, for example, configuration information to configure the client device 308 to connect with the personal cloud device 310. Configuration information may include, for example, an address of the personal cloud device 310, a port of the personal cloud device 310 used for communicating with the client device 308, and/or a protocol used by the personal cloud device 310.

Further, the information transmitted from the public cloud service 302 may include, for example, an authentication token. The personal cloud device 310 may authenticate the client device 308 by verifying that the client device 308 possesses an authentication token matching the authentication token that the personal cloud device 310 received from the public cloud service 302. Hence, an authenticated direct connection is established between the client device 308 and the personal cloud device 310.

In an embodiment, the public cloud service 302 serves to tunnel communications between the client device 308 and the personal cloud device 310. The public cloud service 302 maintains a persistent connection with the personal cloud device 310. Communications may be delivered from the client device 308 to the personal cloud device 310 using (a) a direct connection between the client device 308 and the public cloud service 302 and (b) the persistent connection between the public cloud service 302 and the personal cloud device 310.

In one or more embodiments, the client device 308 transmits a request to bind the public cloud account and the personal cloud account (Operation 354). Based on the identifier of the personal cloud device 310 received at Operation 348, the client device 308 identifies the personal cloud device 310 as the recipient of the request to bind. The request to bind is transmitted using the direct connection or the tunnel connection between the client device 308 and the personal cloud device 310, as described above with reference to Operation 352. The request to bind includes the temporary credential received from the public cloud service 302 at Operation 348. Optionally, the request to bind further includes the key for logging into the personal cloud account received through the user interface at Operation 350.

In one or more embodiments, the personal cloud device 310 verifies pre-approval for binding the public cloud account to the personal cloud account (Operation 356).

The personal cloud device 310 obtains a pre-approval list stored on a data repository associated with the personal cloud device 310. The pre-approval list may be, for example, the pre-approval list 130 of FIG. 1C. The personal cloud device 310 performs a lookup on the pre-approval list to find an entry associated with the username of the public cloud account and the username of the personal cloud account. Upon finding the entry, the personal cloud device 310 verifies that the public cloud account is pre-approved to bind to the personal cloud account associated with the personal cloud device 310.

In an embodiment, the client device 308 received an existing key for the user's personal cloud account at Operation 350. The personal cloud device 310 obtains personal cloud user account information stored on a data repository associated with the personal cloud device 310. The stored personal cloud user account information includes pairs of usernames and keys. Based on the stored personal cloud account information, the personal cloud device 310 determines a key for the personal cloud account. The personal cloud device 310 verifies whether the key for the personal cloud account matches the key received from the client device 308 (which was received as user input). Based on a match between the two keys, the personal cloud device 310 verifies that the key received from the client device 308 is correct.

In an embodiment, the client device 308 received a new key for the user's personal cloud account at Operation 350. The personal cloud device 310 stores the key in association with the user's personal cloud account, such that the user may subsequently use the key for logging into the personal cloud account. Further description regarding storing the new key is included below with respect to Operation 366.

In one or more embodiments, the personal cloud device 310 transmits, to the public cloud service 302, (a) a verification of the pre-approval and (b) the temporary credential received from the client device 308 (Operation 358). The verification of the pre-approval indicates that the pre-approval list associated with the personal cloud device 310 indicates that the personal cloud account and the public cloud account are approved for binding with each other. The temporary credential is used to determine whether the personal cloud device 310 received the request to bind from the client device 308.

In one or more embodiments, the public cloud service 302 verifies whether the temporary credential received from the personal cloud device 310 at Operation 358 matches the temporary credential generated by the public cloud service 302 at Operation 346 (Operation 360). Responsive to determining a match between the temporary credentials, the public cloud service 302 stores a binding between the public cloud account and the personal cloud account (Operation 362). Example steps for storing a binding between a public cloud account and a personal cloud account on a data repository associated with a public cloud service are described above with reference to Operation 254.

In one or more embodiments, the public cloud service 302 transmits a confirmation of the binding to the personal cloud device 310 (Operation 364). Responsive to receiving the confirmation, the personal cloud device 310 stores a binding between the personal cloud account and the public cloud account (Operation 366). Example steps for storing a binding between a public cloud account and a personal cloud account on a data repository associated with a personal cloud device are described above with reference to Operation 210.

In an embodiment, the client device 308 received a new key for the user's personal cloud account at Operation 350. The personal cloud device 310 stores the key in association with the user's personal cloud account, such that the user may subsequently use the key for logging into the personal cloud account. As an example, a data repository associated with a personal cloud device 310 may store pairs of usernames and keys. As part of the binding process, the personal cloud device 310 may receive a new key for a personal cloud account. The personal cloud device 310 may store the new key in association with the username of the user's personal cloud account.

Based on operations of FIG. 3, a binding between a public cloud account and a personal cloud account is generated based on a pre-approval list. Criteria for generating the binding include (a) the public cloud service determining that the public cloud user account and the personal cloud user account are approved to be bound based on a pre-approval list stored on the public cloud service, and (b) the personal cloud device determining that the public cloud user account and the personal cloud user account are approved to be bound based on a pre-approval list stored on the personal cloud device.

A user of a client device 308 need not configure the client device 308 to connect with the personal cloud device 310. Rather, the public cloud service 302 facilitates the establishment of a direct connection or a tunnel connection between the client device 308 and the personal cloud device 310. Further, the user of the client device 308 need not input the personal cloud account username. After logging into the public cloud account, the public cloud service 302 performs a lookup on a pre-approval list to determine that the public cloud account is pre-approved to bind to the personal cloud account. The public cloud service 302 thereby identifies the personal cloud account to be bound to the public cloud account, without the user specifying the personal cloud account.

Figure 4:
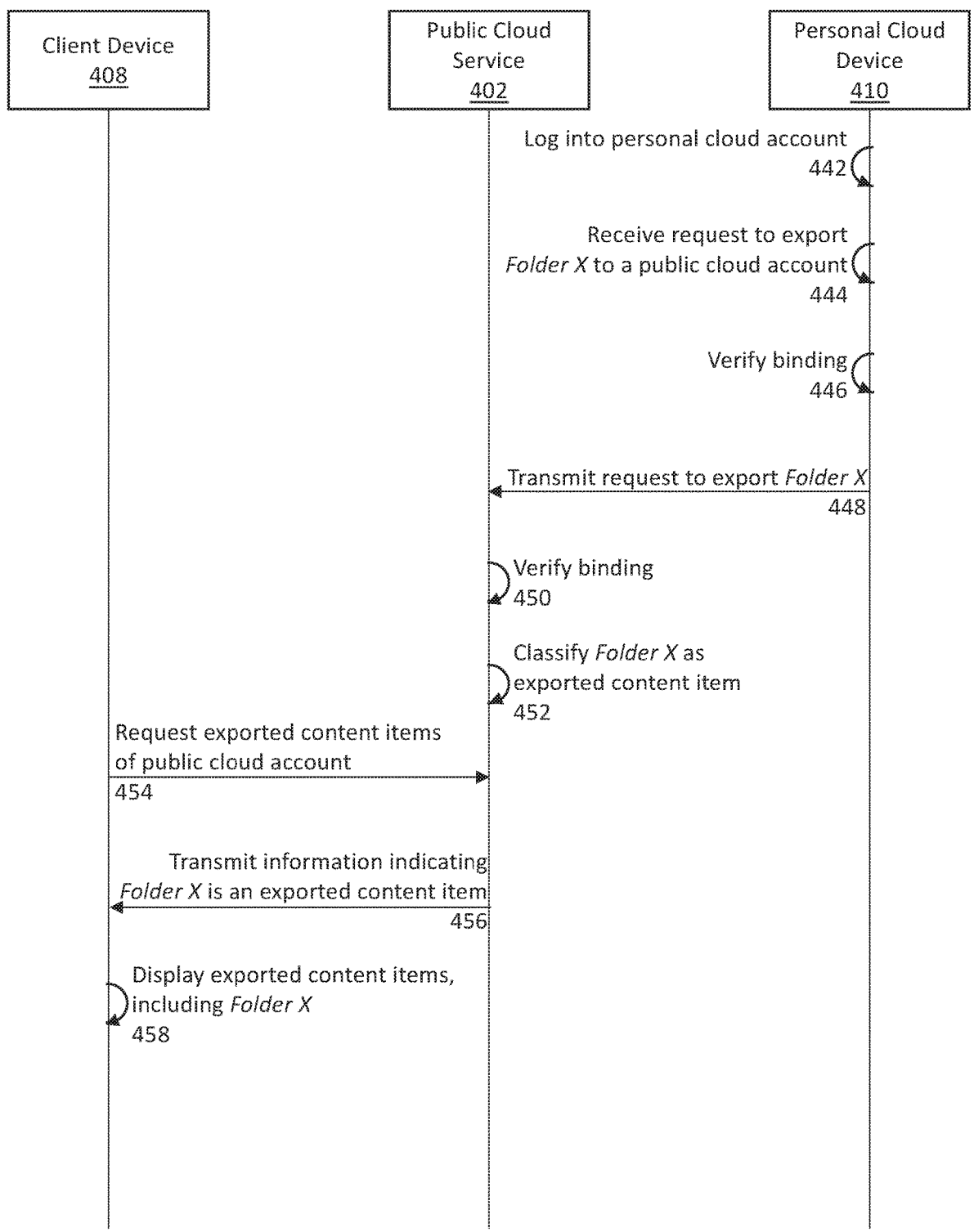
FIG. 4 illustrates an example set of operations for exporting a content item associated with a personal cloud user account to a public cloud user account based on a binding between the two accounts, in accordance with one or more embodiments.

5. Exporting a Content Item Based on a Binding Between a Public Cloud User Account and a Personal Cloud User Account FIG. 4 illustrates an example set of operations for exporting a content item associated with a personal cloud user account to a public cloud user account based on a binding between the two accounts, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments. FIG. 4 illustrates an example for exporting a content item. Additional and/or alternative ways of exporting a content item based on a binding between a public cloud user account and a personal cloud user account may be used.

Client device 408 is similar to any of client devices 108*a-c* of FIG. 1. Public cloud service 402 is similar public cloud service 102 of FIG. 1. Personal cloud device 410 is similar to any of personal cloud devices 110*a-c* of FIG. 1.

In one or more embodiments, a user logs into a personal cloud account associated with a personal cloud device 410 (Operation 442). An interface for the personal cloud device 410 presents a prompt requesting a username (or other identifier) of a personal cloud account. The interface for the personal cloud device also requests a key for logging into the personal cloud account. The interface receives the username and key. The personal cloud device 410 verifies the information and allows the user to log into the personal cloud account.

In alternative embodiments, a user may log into the personal cloud account using alternative means. As an example, a user may use a client device 408 to log into the personal cloud account.

In one or more embodiments, the personal cloud device 410 receives a request to export a personal cloud content item (such as Folder X) to a public cloud account (Operation 444). The interface for the personal cloud device 410 receives user input indicating a request to export Folder X.

In alternative embodiments, a user may submit a request to export the content item using alternative means. As an example, a user may use a client device 408 to enter and submit a request to export a personal cloud content item.

In one or more embodiments, the personal cloud device 410 determines whether there is a binding between the personal cloud account and any public cloud account (Operation 446). The personal cloud device 410 obtains a binding list from a data repository associated with the personal cloud device 410. The binding list may be, for example, the binding list 132 of FIG. 1C. The personal cloud device 410 performs a lookup on the binding list using the username of the personal cloud account. The personal cloud device 410 finds an entry in the binding list associated with the username of the personal cloud account. The entry in the binding list includes (a) the username of the personal cloud account and (b) a username of a public cloud account. Based on the above information, the personal cloud device 410 determines that the personal cloud account is bound to the public cloud account.

In one or more embodiments, the personal cloud device 410 transmits a request to export Folder X to the public cloud account (Operation 448). The request is transmitted to the public cloud service 402. The request includes the username of the personal cloud account and the username of the public cloud account.

In one or more embodiments, the public cloud service 402 verifies the binding between the personal cloud account and the public cloud account (Operation 450). The public cloud service 402 obtains a binding list from a data repository associated with the public cloud service 402. The binding list may be, for example, binding list 122 of FIG. 1B. The public cloud service 402 performs a lookup on the binding list. The public cloud service 402 finds an entry in the binding list including (a) the username of the personal cloud account and (b) the username of the public cloud account. The public cloud service 402 verifies that the personal cloud account is bound to the public cloud account.

In one or more embodiments, the public cloud service 402 classifies Folder X as an exported content item (Operation 452). The public cloud service 402 stores an association between the public cloud account and the content item ID of Folder X The content item ID of Folder X may be stored as an "exported content item ID" associated with the public cloud account. The public cloud service 402 may store a pointer (or other reference) to the storage location of Folder X, the storage location being within a data repository associated with the personal cloud device 410. Hence, if a user requests to access Folder X using the public cloud account, the public cloud service 402 may access Folder X based on the storage location indicated by the pointer. The public cloud service 402 may but need not make a duplicate copy of Folder X (and the contents thereof) on a data repository associated with the public cloud service 402.

In one or more embodiments, a client device 408 transmits a request for exported content items of the public cloud account (Operation 454). A user logs into the public cloud account using the client device 408. The user further submits a request for exported content items of the public cloud account. Responsive to receiving the request for exported content items from the user, the client device 408 transmits the request for exported content items to the public cloud service 402.

In one or more embodiments, the public cloud service 402 transmits information identifying the exported content items, including Folder X, to the client device 408 (Operation 456). The public cloud service 402 may transmit the names of the exported content items, the types of the exported content items (such as, folder or file, extension types), the sizes of the exported content items, the security levels of the exported content items (such as, read only, write permissions, sharing permissions), and/or other information.

In one or more embodiments, the client device 408 displays the exported content items, including Folder X, on a user interface (Operation 458). The client device 408 may display the information received from the public cloud service 402, such as the names of the exported content items, the types of the exported content items, the size of the exported content items, and/or the security levels of the exported content items.

Each icon associated with an exported content item may be hyperlinked to the exported content item. When a user of the client device 408 clicks on the icon, the client device 408 transmits a request to open and/or download the exported content item to the public cloud service 402. The public cloud service 402 obtains the pointer to the exported content item. The public cloud service 402 obtains the exported content item from the storage location indicated by the pointer, the storage location being within a data repository associated with the personal cloud device 410.

Based on the operations of FIG. 4, a personal cloud content item associated with a personal cloud account is exported to a public cloud account only after verification of a binding by both the personal cloud device 410 and the public cloud service 402. The personal cloud device 410 verifies the binding between the personal cloud account and the public cloud account based on a binding list stored on a data repository associated with the personal cloud device 410. The public cloud service 402 verifies the binding between the personal cloud account and the public cloud account based on a binding list stored on a data repository associated with the public cloud service 402. Hence, a binding between a public cloud account and a personal cloud account is a criterion for exporting a content item, that is stored in association with the personal cloud user account to the public cloud user account. After a personal cloud content item is exported to a public cloud account, a user may access the personal cloud content item using the public cloud account, without logging into the personal cloud account.

Figure 5:
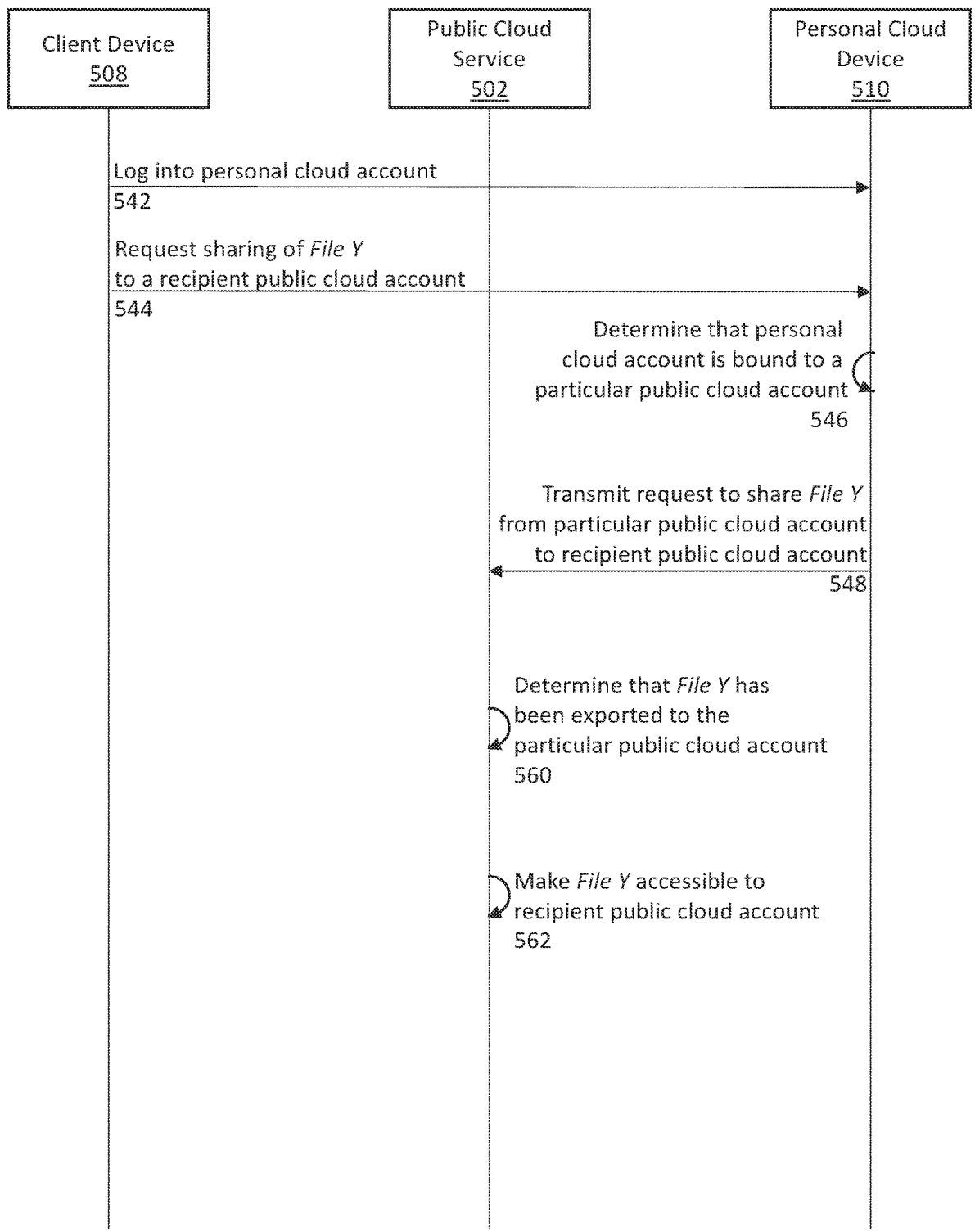
FIG. 5 illustrates an example set of operations for sharing a content item associated with a personal cloud user account using a public cloud user account based on a binding between the two accounts, in accordance with one or more embodiments.

6. Sharing a Content Item Based on a Binding Between a Public Cloud User Account and a Personal Cloud User Account FIG. 5 illustrates an example set of operations for sharing a content item associated with a personal cloud user account using a public cloud user account based on a binding between the two accounts, in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

Client device 508 is similar to any of client devices 108a-c of FIG. 1. Public cloud service 502 is similar public cloud service 102 of FIG. 1. Personal cloud device 510 is similar to any of personal cloud devices 110a-c of FIG. 1.

In one or more embodiments, a client device 508 logs into a personal cloud account associated with a personal cloud device 510 (Operation 542). Example steps for logging into a personal cloud account from a client device are described above with reference to Operation 244 of FIG. 2.

In one or more embodiments, the client device 508 transmits a request to share a personal cloud content item (such as File Y) to a recipient public cloud account associated with a public cloud service 502 (Operation 544). The client device 508 receives user input indicating a request to share File Y. The user input requests sharing File Y with a particular public cloud account (referred to herein as a "recipient public cloud account"). Responsive to receiving the user input, the client device 508 transmits the request to share File Y to the personal cloud device 510.

In alternative embodiments, a user may submit a request to share the content item using alternative means. As an example, a user may use an interface of the personal cloud device (rather than the client device 508) to enter and submit a request to share a personal cloud content item.

In one or more embodiments, the personal cloud device 510 determines whether there is a binding between the personal cloud account and any public cloud account (Operation 546). Example steps for determining whether there is a binding are described above with reference to Operation 446 of FIG. 4. Based on a binding list stored on a data repository associated with the personal cloud device, the personal cloud device 510 determines that the personal cloud account is bound to a particular public cloud account.

In one or more embodiments, the personal cloud device 510 transmits a request to share File Y (Operation 548). The request to share specifies sharing File Y with the recipient public cloud account using the particular public cloud account. The request is transmitted to the public cloud service 502.

In one or more embodiments, the public cloud service 502 determines whether File Y has been exported to the particular public cloud account (Operation 550). The public cloud service 502 receives the request to share File Y using the particular public cloud account. The public cloud service 502 obtains exported content item IDs that have been stored in association with the particular public cloud account. The public cloud service 502 determines that the content item ID of File Y is one of the exported content item IDs associated with the particular public cloud account. Additionally or alternatively, the public cloud service 502 determines that File Y is within another content item (such as Folder X), and that the content item ID of Folder X is one of the exported content item IDs associated with the particular public cloud account. Therefore, the public cloud service 502 determines that File Y has been exported to the particular public cloud account.

In one or more embodiments, the public cloud service 502 makes File Y accessible to the recipient public cloud account (Operation 562). The public cloud service 502 stores an association between the recipient public cloud account and the content item ID of File Y. The content item ID of File Y may be stored as a "shared content item ID" associated with the recipient public cloud account. The public cloud service 502 may store a pointer (or other reference) to the storage location of File Y, the storage location being within a data repository associated with the personal cloud device 510. Hence, if a user requests to access File Y using the recipient public cloud account, the public cloud service 402 may access File Y based on the storage location indicated by the pointer. The public cloud service 502 may but need not make a duplicate copy of File Y on a data repository associated with the public cloud service 502.

The public cloud service 502 may provide a notification to a user of the recipient public cloud account, indicating that File Y has been shared from the particular public cloud account. The public cloud service 502 need not provide a username of the personal cloud account associated with File Y to the recipient public cloud account.

A user of the recipient public cloud account may use a client device to log into the recipient public cloud account. The client device may present information indicating the content items that have been shared with the recipient public cloud account. The information presented may include information indicating that File Y has been shared from the particular public cloud account. The information presented need not include a username of the personal cloud account associated with File Y.

Based on the operations of FIG. 5, a personal cloud content item associated with a personal cloud account of a particular user is shared from a public cloud user account of the particular user (also referred to as an "originating user"). The personal cloud content item is shared with a public cloud account of another user (also referred to as a "recipient user"). The sharing is performed only after (a) verifying that the personal cloud account and the public cloud account of the originating user are bound together and (b) verifying that the personal cloud content item has been exported to the public cloud account of the originating user. Hence, (a) a binding between an originating user's personal cloud account and public cloud account, and (b) exportation of a content item from the personal cloud account to the public cloud account, are criteria for sharing the content item using the originating user's public cloud user account. After a personal cloud content item is shared with a public cloud account of a recipient user, the recipient user may access the personal cloud content item using the recipient user's public cloud account. The recipient user need not be aware of the personal cloud account of the originating user.

7. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

In an example, a hybrid cloud service includes (a) a public cloud service run by a hybrid cloud service provider, and (b) personal cloud devices owned by various users. The hybrid cloud service is accessed by various client devices.

An administrator and/or owner of a personal cloud device P desires to enable an additional user, John Smith, on the personal cloud device. The administrator proceeds to establish a new account, associated with the identifier bestie, for John. The administrator logs into the personal cloud device P. The administrator enters user input to pre-approve the following: (a) a user of a cloud user account, associated with the identifier john.smith@exampleemail.com, to be able to create a local user account, bestie, and (b) the user of the local user account, bestie, to be able to bind to the cloud user account, john.smith@exampleemail.com, for global access and sharing purposes.

The above requests result in: (a) creation of a record of a pre-approval for binding the cloud user accountjohn.smith@exampleemail.com and the local user account bestie, and storage of the record on the personal cloud device P, and (b) creation of a record of a pre-approval for binding the cloud user accountjohn.smith@exampleemail.com and the local user account bestie associated with the personal cloud device P, and storage of the record on the public cloud.

Optionally, the public cloud (or the personal cloud device) causes a notification (such as an email) to be sent to John (using, for example, the email address john.smith@exampleemail.com associated with the cloud user account).

Upon receipt of the notification, John uses a client application on John's client device (such as a smartphone or a laptop) to login to John's cloud user account, john.smith@exampleemail.com. (Alternatively, if John's cloud user account has not been created yet, John creates the cloud user account and then logs in.)

The client application queries the public cloud service to determine whether there is a pre-approved binding between John's cloud user account, john.smith@exampleemail.com, and any local user account.

The client application receives information the public cloud service indicating that the local account account bestie, associated with the personal cloud device P, is awaiting completion of local user account setup, which includes binding to the cloud user account john.smith@exampleemail.com.

The client application connects to the personal cloud device P. The public cloud service facilitates the connection (either through a relay channel or a peer-to-peer connection).

The client application requests a temporary credential from the public cloud service for the purpose of validating that the holder of the temporary credential has the identity of the cloud user account john.smith@exampleemail.com.

The client application makes a request to the personal cloud device P (through the established connection, described above) to complete the setup of local user account bestie. The client application identifies itself as using the cloud user account, john.smith@exampleemail.com, and sending the temporary credential to the personal cloud device as proof of the client application's identity.

The personal cloud device confirms against the personal cloud device's own record that the local user account bestie is to be setup and bound to cloud user account john.smith@exampleemail.com. The personal cloud device further checks the temporary credential received from the client application against the record of the public cloud service to validate that the temporary credential is owned by the cloud user account john.smith@exampleemail.com.

Upon validating the temporary credential as owned by cloud user account john.smith@exampleemail.com, the personal cloud device performs the following: (a) accepts a new password information for local user account bestie, entered by John Smith through the client application, and (b) sends a final request to the public cloud service to confirm the binding of cloud user account john.smith@ exampleemail.com to the local user account bestie of Personal Cloud Device P.

Then, each of the public cloud and the personal cloud device P record the information indicating the binding between the cloud user account john.smith@ exampleemail.com and the local user account bestie of Personal Cloud Device P.

Optionally, additional operations for completing setup may be performed. For example, default folders of the local user account bestie may be exported to the cloud user account john.smith@exampleemailcom. A final notification may be sent to the administrator of the personal cloud device P, indicating that cloud user account john.smith@exampleemail.com has completed the setup and binding process for the local user account bestie.

Figure 6A:
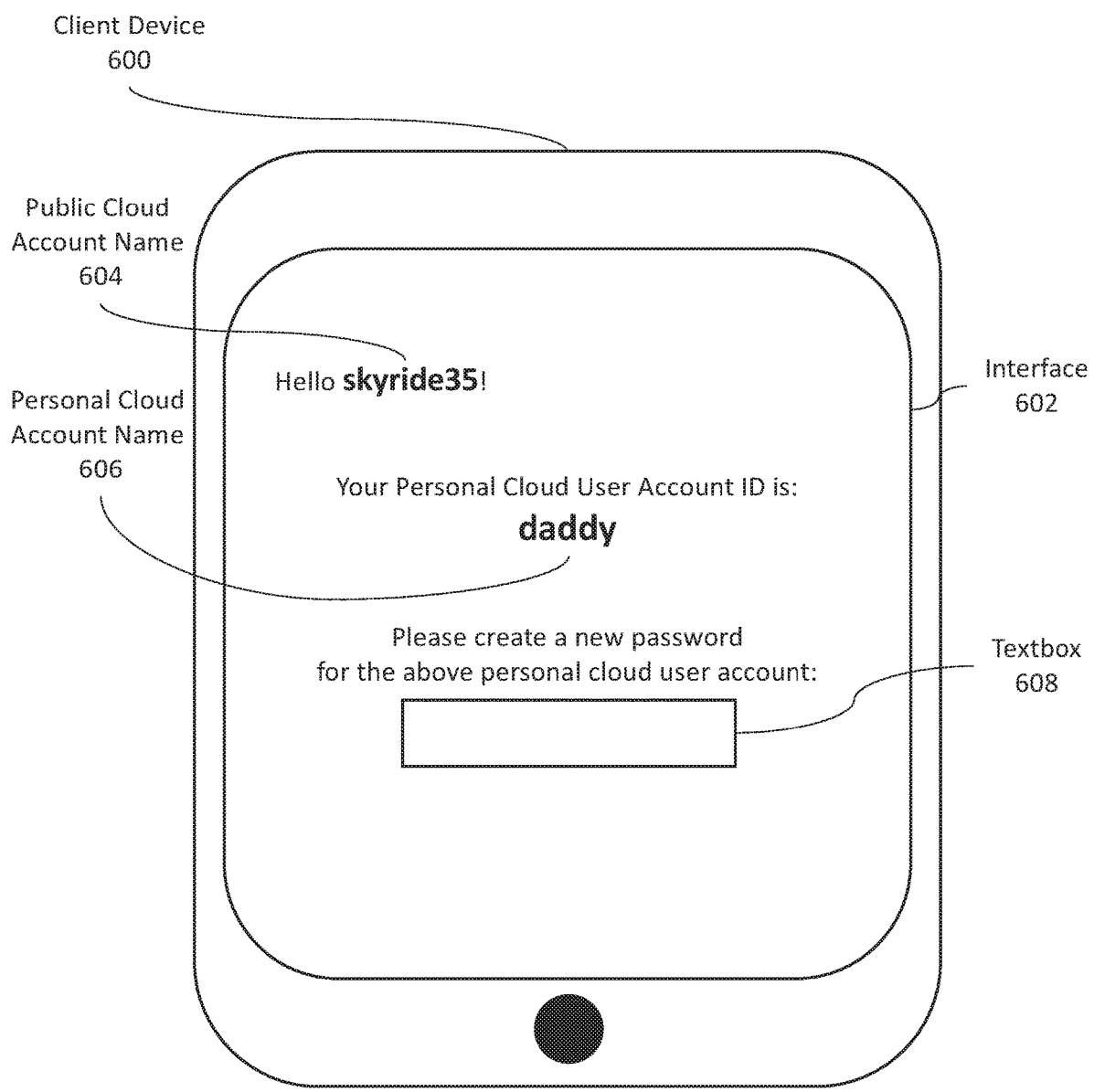
FIGS. 6A-6C illustrate example user interfaces associated with a client device, in accordance with one or more embodiments.
Figure 6B:
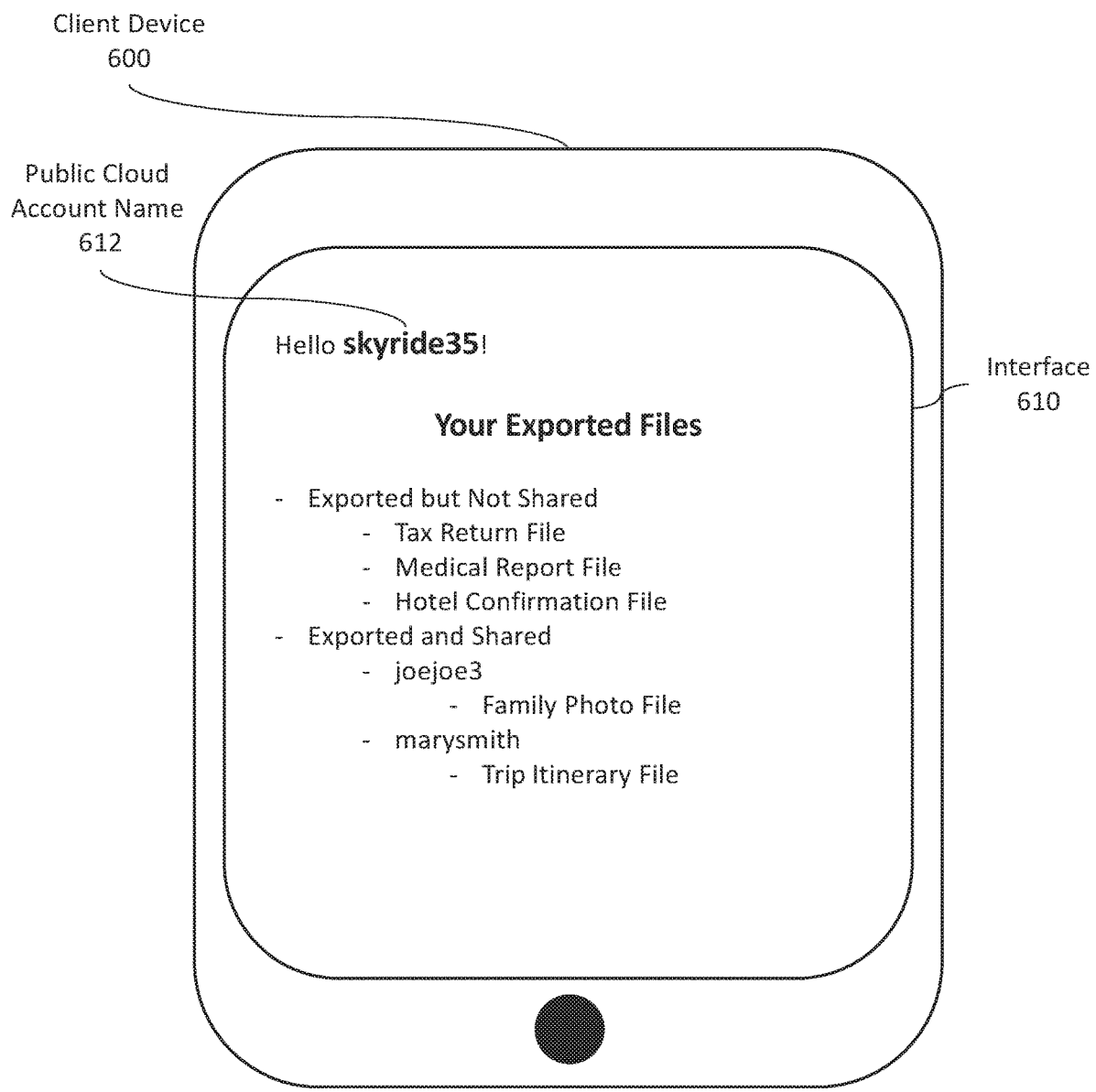
Figure 6C:
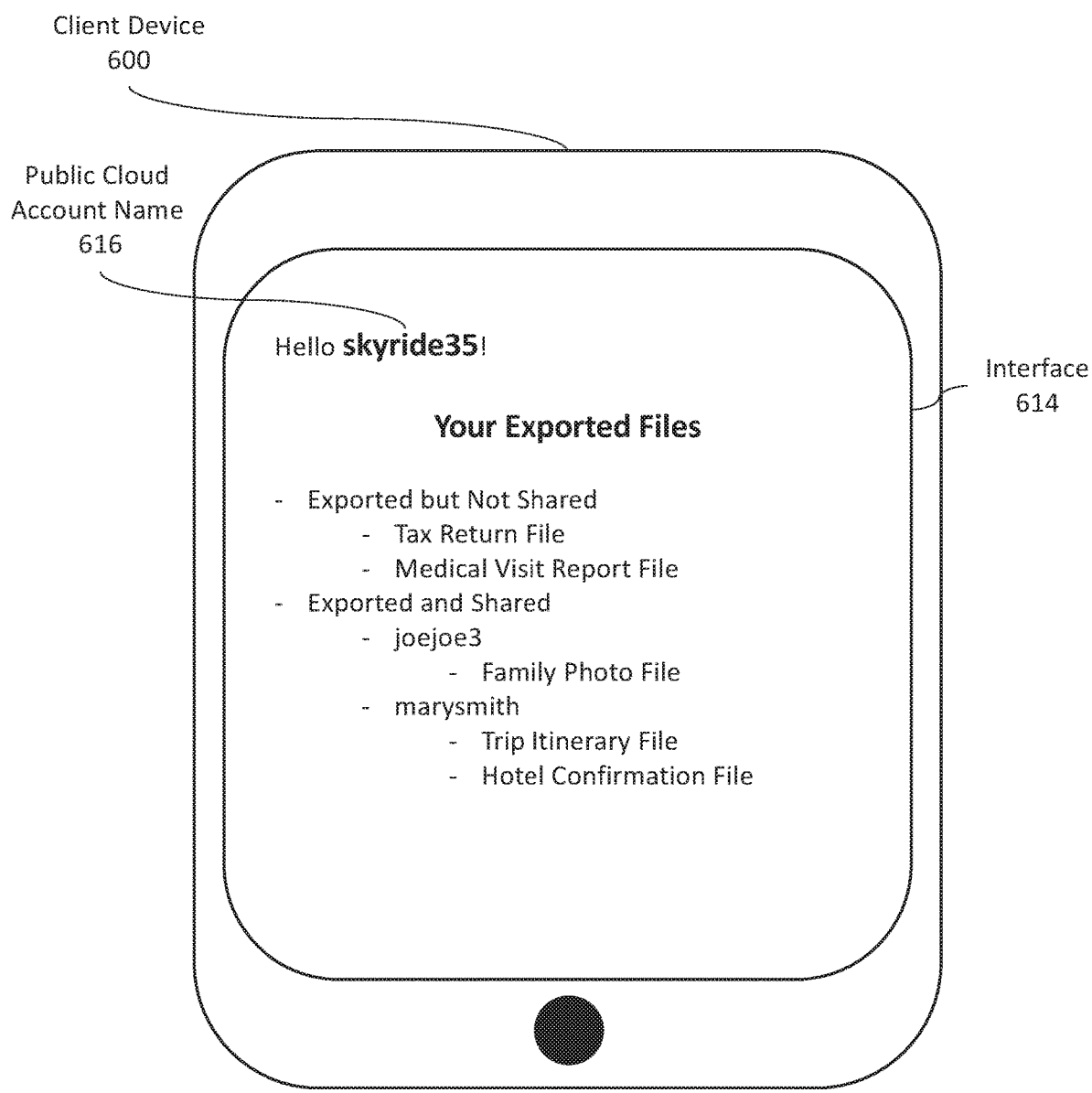

FIGS. 6A-6C illustrate example user interfaces associated with a client device 600, in accordance with one or more embodiments.

Referring to FIG. 6A, user interface 602 of client device 600 may be presented to a user who is logged into a public cloud user account, skyride35.

A user logs into a public cloud account, skyride35, for using a public cloud service. The public cloud service determines that the public cloud account, skyride35, is pre-approved to bind with a particular personal cloud account, daddy, for using a particular personal cloud device. The public cloud service transmits, to client device 600, (a) an identifier of the personal cloud account, and (b) a temporary credential generated by the public cloud service. Based on the user's login to the public cloud account, the binding of the public cloud account and the personal cloud account may be completed without further user involvement.

Optionally, the client device 600 presents user interface 602 to request a new key for the personal cloud account. User interface 602 includes the public cloud account name 604, skyride35. User interface 602 also includes the personal cloud account name 606, daddy. User interface 602 also includes a textbox 608 configured to receive the new key for the personal cloud account, daddy. Optionally, the client device 600 transmits the new key to the personal cloud device (along with the request to bind, which is described below). The personal cloud device stores the new key in association with the personal cloud account, daddy, such that the user may subsequently use the same key for logging into the personal cloud account, daddy. Hence, the user may create a password for the personal cloud account, daddy, at the same time as conducting a binding process for the personal cloud account daddy and the public cloud account skyride35.

After receiving (a) the identifier of the personal cloud account and (b) the temporary credential, the client device 600 transmits a request to bind to the personal cloud device. The request to bind includes the temporary credential received from the public cloud service. The personal cloud device verifies that the public cloud account skyride35 and the personal cloud account daddy are pre-approved for binding. The personal cloud device transmits, to the public cloud service, (a) a verification of the pre-approval, and (b) the temporary credential received from the client device 600.

The public cloud service verifies that the temporary credential received from the personal cloud device is correct. Upon verification, the public cloud service stores a binding between the public cloud account skyride35 and the personal cloud account daddy. The public cloud service transmits a confirmation to the personal cloud device. The personal cloud device stores a binding between the public cloud account skyride35 and the personal cloud account daddy. Hence, each of the public cloud service and the personal cloud device stores information indicating a binding between the public cloud account skyride35 and the personal cloud account daddy.

Referring to FIG. 6B, user interface 610 of client device 600 is presented to indicate the exported files associated with a public cloud user account, skyride35.

User interface 610 includes the public cloud account name 612, skyride35. User interface 610 also shows content items arranged in a file directory. One directory is labeled "Exported but Not Shared." Another directory is labeled "Exported and Shared."

Under "Exported but Not Shared" are files that have been exported from a personal cloud account to the public cloud account skyride35. The exported files include Tax Return File, Medical Report File, and Hotel Confirmation File. The exported files are stored on one or more personal cloud devices. The exported files are accessible using the public cloud account skyride35.

Under "Exported and Shared" are two sub-directories: "joejoe3" and "marysmith." Under "joejoe3" are files that have been shared with the public cloud user account joejoe3. The shared files include Family Photo File. Under "marysmith" are files that have been shared with the public cloud user account marysmith. The shared files include Trip Itinerary File. The files are shared using the public cloud account skyride35.

A user of the public cloud account skyride35 is planning a trip with a user of the public cloud account marysmith. The user of the public cloud account skyride35 has already shared Trip Itinerary File with marysmith. The user of the public cloud account skyride35 now requests to share Hotel Confirmation File with marysmith.

The user logs into the user's personal cloud account, honey, for using a personal cloud device. The user submits, to the personal cloud device, a request to share Hotel Confirmation File with marysmith. The personal cloud device determines that Hotel Confirmation File is stored in association with honey on the personal cloud device. The personal cloud device determines that the personal cloud account honey is bound to the public cloud account skyride35. The personal cloud device transmits a request to share Hotel Confirmation File with marysmith using skyride35. The request is transmitted to the public cloud service.

The public cloud service determines that Hotel Confirmation File is an exported file of skyride35. The public cloud service makes Hotel Confirmation File accessible to marysmith. The user of marysmith sees that Hotel Confirmation File has been shared from skyride35, rather than honey.

Referring to FIG. 6B, user interface 610 of client device 600 is presented to indicate the exported files associated with a public cloud user account, skyride35. User interface 614 includes the public cloud account name 616, skyride35. After the user of skyride35 has requested sharing of Hotel Confirmation File, Hotel Confirmation File now appears under "marysmith" under "Exported and Shared." Based on the public cloud account name 616 and other information presented by user interface 614, user interface 614 indicates that Hotel Confirmation File has been shared with marysmith using the public cloud account skyride35.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
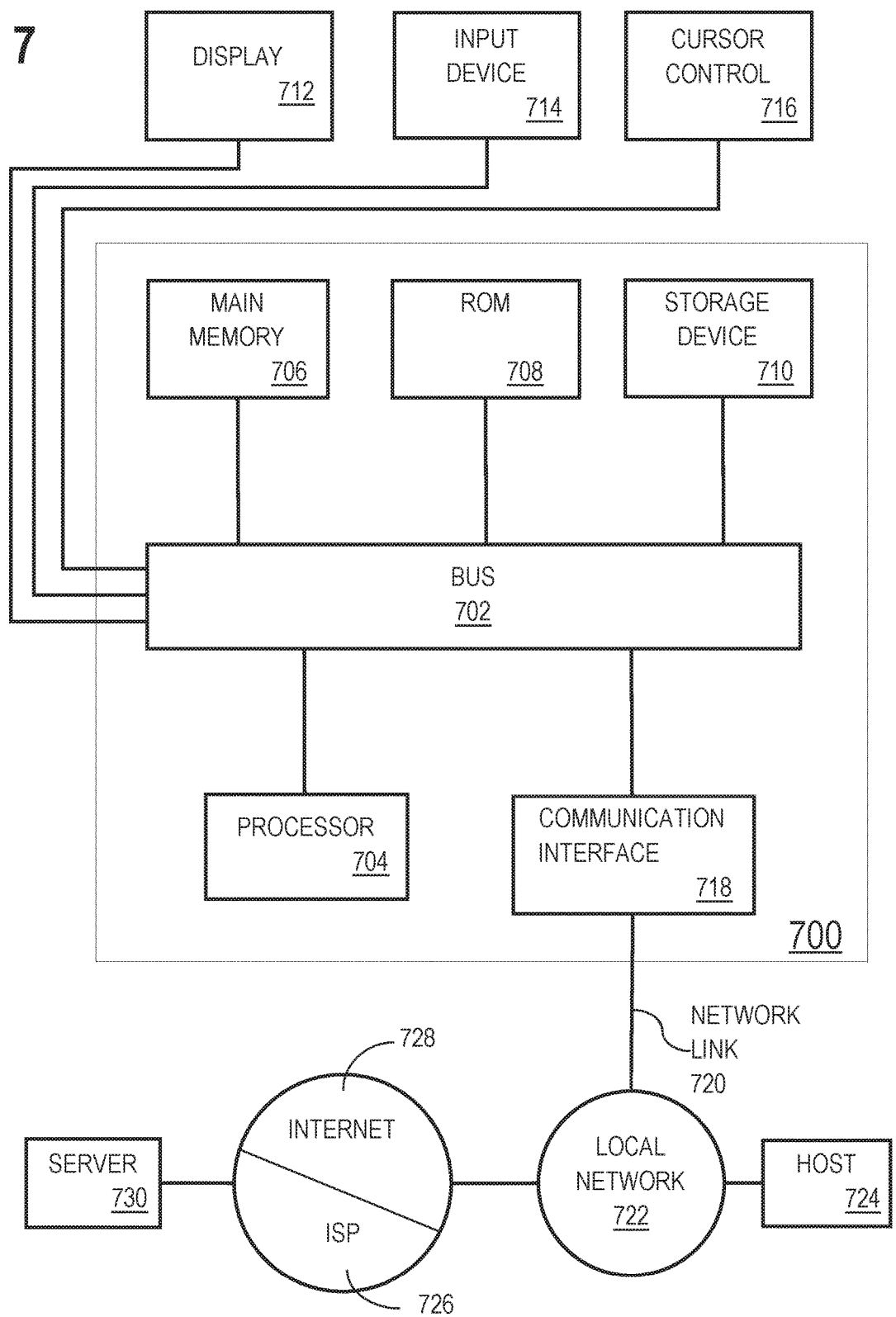
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    identifying a public cloud user account of a user for using a public cloud service;
    obtaining information, by an application from a public cloud service, indicating a pre-approval for binding (a) the public cloud user account and (b) a personal cloud user account of the user for using a personal cloud device;
    transmitting, by the application to the personal cloud device, a request to bind the public cloud user account and the personal cloud user account, the request to bind comprising an identifier associated with the public cloud user account;
    obtaining, by the application, a confirmation indicating that a binding between the public cloud user account and the personal cloud user account has been generated in response to the request to bind;
    wherein the binding is a criterion for sharing data, that is (a) stored on the personal cloud device and (b) associated with the personal cloud user account, from the public cloud user account to a second public cloud user account of a second user for using the public cloud service.

2. The one or more media of claim 1, further storing instructions which, when executed by the one or more processors, cause:
    responsive to obtaining the information indicating the pre-approval for binding the public cloud user account and the personal cloud user account: presenting, by the application, a username associated with the personal cloud user account.

3. The one or more media of claim 1, wherein the public cloud service facilitates establishment of a connection between a client device executing the application and the personal cloud device, and the request to bind is transmitted by the application to the personal cloud device using the connection.

4. The one or more media of claim 1, further storing instructions which, when executed by the one or more processors, cause:
    receiving, by the personal cloud device, the request to bind the public cloud account and the personal cloud account;
    determining, by the personal cloud device, whether the public cloud user account is approved to bind to the personal cloud user account based on a pre-approval list stored on a data repository associated with the personal cloud device.

5. The one or more media of claim 1, wherein the information, obtained by the application from the public cloud service, indicating the pre-approval for binding the public cloud user account and the personal cloud user account is determined based on a pre-approval list stored on a data repository associated with the public cloud service.

6. The one or more media of claim 1, wherein (a) the public cloud service determining that the public cloud user account and the personal cloud user account are approved to be bound based on a first pre-approval list stored on the public cloud service, and (b) the personal cloud device determining that the public cloud user account and the personal cloud user account are approved to be bound based on a second pre-approval list stored on the personal cloud device, are criteria for generating the binding between the public cloud user account and the personal cloud user account.

7. The one or more media of claim 1, wherein generating the binding between the public cloud user account and the personal cloud user account comprises:
    storing a first set of information indicating the binding between the public cloud user account and the personal cloud user account on a first data repository associated with the public cloud service; and
    storing a second set of information indicating the binding between the public cloud user account and the personal cloud user account on a second data repository associated with the personal cloud device.

8. The one or more media of claim 1, wherein the request to bind further comprises a credential generated by the public cloud service, and the credential is used by the public cloud service to validate that a holder of the credential has an identity of the public cloud user account.

9. The one or more media of claim 1, further storing instructions which, when executed by the one or more processors, cause:
    presenting, by the application, a request for a new key corresponding to the personal cloud user account;
    receiving, by the application, the new key corresponding to the personal cloud user account;
    transmitting, by the application to the personal cloud device, the new key;
    wherein the personal cloud device stores the new key as validation information for logging into the personal cloud user account.

10. The one or more media of claim 1, wherein the binding is further a criterion for exporting data, that is (a)

stored in association with the personal cloud user account, and (b) stored on the personal cloud device, to the public cloud user account.

11. One or more non-transitory machine-readable media storing instructions which, when executed by one or more processors, cause:

identifying a public cloud user account of a user for using a public cloud service;

determining that the public cloud user account is pre-approved to bind to a personal cloud user account of the user for using a personal cloud device;

generating a first credential;

transmitting, to a client device, (a) information indicating that the public cloud user account is pre-approved to bind to the personal cloud user account and (b) the first credential;

receiving, from the personal cloud device, (a) a verification that the public cloud user account is pre-approved to bind to the personal cloud user account and (b) a second credential;

determining whether there is a match between the first credential and the second credential;

responsive to determining that there is the match between the first credential and the second credential: storing information indicating a binding between the public cloud user account and the personal cloud user account;

wherein the binding is a criterion for sharing data, that is (a) stored on the personal cloud device and (b) associated with the personal cloud user account, from the public cloud user account to a second public cloud user account of a second user for using the public cloud service.

12. The one or more media of claim 11, wherein determining that the public cloud user account is pre-approved to bind to the personal cloud user account is based on a pre-approval list stored on the public cloud service.

13. The one or more media of claim 11, wherein the verification, received from the personal cloud device, that the public cloud user account is pre-approved to bind to the personal cloud user account is based on a pre-approval list stored on the personal cloud device.

14. The one or more media of claim 11, further storing instructions which, when executed by the one or more processors, cause:

storing, by the personal cloud device, another set of information indicating the binding between the public cloud user account and the personal cloud user account on a data repository associated with the personal cloud device.

15. One or more non-transitory machine-readable media storing instructions which, when executed by one or more processors, cause:

receiving a first request to bind a public cloud user account for using a public cloud service and a personal cloud user account for using a personal cloud device;

responsive to determining that the public cloud user account is approved to bind to the personal cloud user account: transmitting, to the public cloud service, a verification indicating that the public cloud user account and the personal cloud user account are approved to be bound;

responsive to obtaining, from the public cloud service, a confirmation indicating that the public cloud service has stored a first set of information indicating a binding between the public cloud user account and the personal cloud user account:

storing, on a data repository associated with the personal cloud device, a second set of information indicating the binding between the public cloud user account and the personal cloud user account;

wherein the binding is a criterion for sharing data, that is (a) stored on the personal cloud device and (b) associated with the personal cloud user account, from the public cloud user account to a second public cloud user account of a second user for using the public cloud service.

16. The one or more media of claim 15, wherein determining that the public cloud user account is approved to bind to the personal cloud user account is based on a pre-approval list stored on the data repository associated with the personal cloud device.

17. The one or more media of claim 16, further storing instructions which, when executed by the one or more processors, cause:

determining, by the public cloud service, that the public cloud user account is approved to bind to the personal cloud user account based on a second pre-approval list stored on a second data repository associated with the public cloud service.

* * * * *